July 11, 1961 N. HAGEN 2,991,500

METHOD AND APPARATUS FOR MAKING PLASTIC CONTAINERS

Filed June 17, 1958 3 Sheets-Sheet 1

INVENTOR.
Norbert Hagen
BY Richard Ag't

METHOD AND APPARATUS FOR MAKING PLASTIC CONTAINERS

Filed June 17, 1958 3 Sheets-Sheet 2

INVENTOR.
Norbert Hagen
BY Richard ... Ag't

METHOD AND APPARATUS FOR MAKING PLASTIC CONTAINERS

Filed June 17, 1958

INVENTOR.
Norbert Hagen
BY
Richard ... Ag't

United States Patent Office 2,991,500

Patented July 11, 1961

2,991,500

METHOD AND APPARATUS FOR MAKING PLASTIC CONTAINERS

Norbert Hagen, 23 Heinrichstrasse, Siegburg, Rhineland, Germany

Filed June 17, 1958, Ser. No. 742,602

3 Claims. (Cl. 18—5)

This invention relates to a method and apparatus for making plastic containers, and more particularly for making sterile plastic containers.

The term "sterile containers" covers, for instance, serum and vaccine containers, culture dishes, specimen vials, sputum bottles, water sample bottles, and containers to hold food and beverages. Whenever hereinafter in the specification and claims a term, such as "container," "ampoule," "bottle," is used, this is only done for the purpose of convenience in description. Each of these terms and the showing in the drawings of an ampoule or a bottle is intended to cover any kind of sterile plastic vessel.

Ampoules which are used to hold a solution for hypodermic injection are generally made of a non-corrosive glass to eliminate contamination due to the dissolving of alkali and soluble silicates. On the other hand, they are produced under nonsterile conditions and, in addition, are brought on the market with an open-ended tip, so that they are received at the places where they are filled in a condition of contamination due to the exposure to germs. The known ampoules must be sterilized before they can be filled. The present invention aims at ampoules or other containers which need not be sterilized before filling, yet protect the contents held from the action of germs.

As for the known glass ampoules, they often hold glass splinters formed during the production, which have to be removed prior to filling. Such removal is done by rinsing with water, which rinsing calls for a subsequent drying operation by applying a vacuum. Thus, there is a number of operations which usually go before sterilization when glass ampoules are used.

Important objects of my invention center about a method and an apparatus which will lead to a sterile container and thus will do away with all presterilization operations as well as with the sterilization itself. Another important object of the present invention is to provide a sterile container that will stay sterile under nonsterile conditions. Other objects of the invention will appear from the following description.

Generally speaking, the plastic container consists of a single piece and constitutes a sealed chamber when empty. The interior of the container is sterile. The method of making such a container comprises placing plastic material, while in a hot condition of plasticity, into the space between open mold sections. I start, for instance, with plastic tubing that is fed or placed between the open mold sections. The sections have sharp edges around cavities provided in the sections, which edges, as the mold is closed, pinch off the segment of the tubing within the mold, thereby sealing the leading and trailing ends of the segment pinched off. However, provision is made that there will be one opening in the otherwise closed segment for a subsequent blowing action. A pressure medium admitted through said opening expands the tubing segment to the interior shape of the mold. Thus far, the steps of the method are of a conventional nature. It is according to the invention that the blown container which is open at one end is now fully sealed, while still in a hot condition of plasticity. Upon cooling, with the mold opened, the sealed container is removed from the mold.

With the foregoing and such other objects as will appear hereinafter in view, the invention consists in the method and apparatus for making such sterile containers, as are more particularly described in the specification and are shown in the accompanying drawings, and are sought to be defined in the claims.

Figure 1:
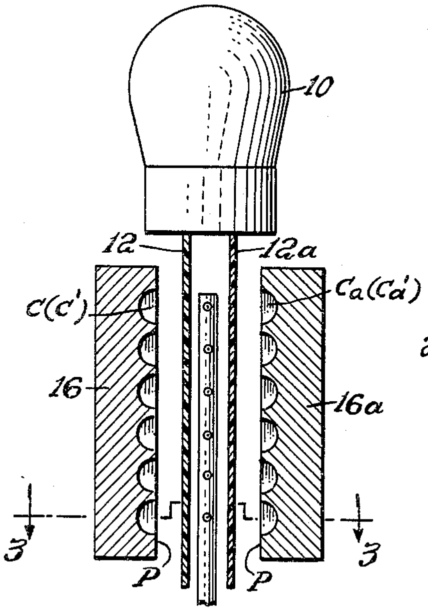
FIG. 1 is a section in elevation through an apparatus for blowing plastic containers, embodying features of my invention, this view showing the sections of a two-section mold in open condition, and two plastic strips suspending into the open mold space.

Referring to the drawings in greater detail, and initially to FIGS. 1 to 5, extrusion nozzles of a press 10 open downwardly and extrude simultaneously two strips 12 and 12*a* of a thermoplastic material to suspend in a substantially parallel relationship into the space between two sections 16 and 16*a* of a sectional mold. The two mold sections are movable relatively to each other to be closed and opened and are shown open in FIGS. 1 and 3. Each of the mold sections is provided with twelve cavities which mate, with the mold sections in closed condition, with the twelve cavities of the other mold section in the parting plane P of the mold to form composite cavities for twelve bottles.

Figure 2:
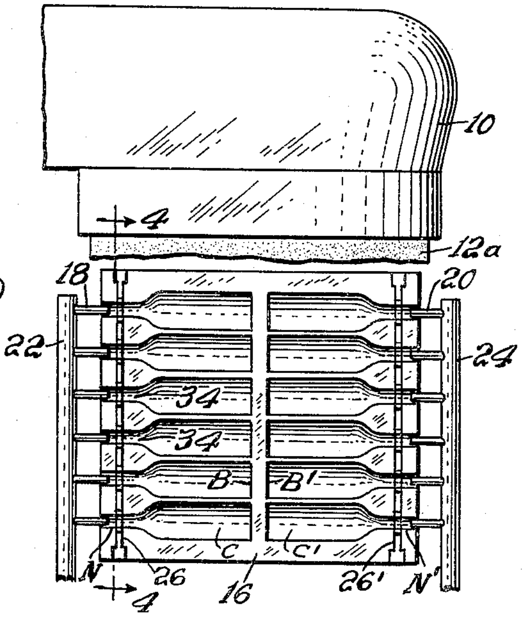
FIG. 2 is an elevational view of one of the mold sections, showing the parting surface of this section, with the plastic strips removed.

The twelve cavities C and C′ in the mold section or mold half 16, as can be seen from FIG. 2, are arranged in two rows beside one another, six half cavities C and C′, respectively, being spacedly provided one above the other in a row. Each of the half cavities of each row is aligned with one of the half cavities of the other row, and the bottoms B and B′ of each aligned pair of half cavities are adjacent to one another whereas the neck parts N and N′ are directed outwardly and away from one another. The twelve half cavities C*a* and C*a*′ in the mold half 16*a* are identically arranged.

It will be apparent that within the limits of practicability the mold sections may be provided with any number of half cavities and that the half cavities may be arranged in any way and may be given any shape other than the shown bottle shape.

Figure 3:
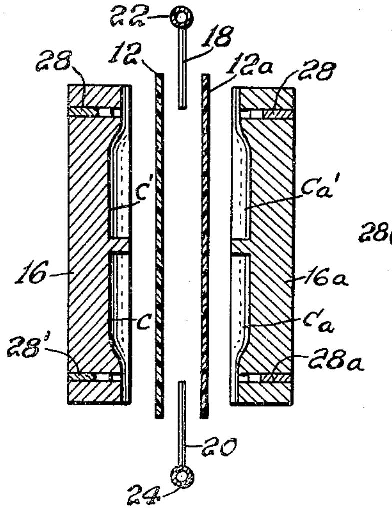
FIG. 3 is a horizontal section taken in the plane of the line 3—3 of FIG. 1.

From FIG. 3 it will be seen that blow pipes 18 and 20 extend, parallel to the strips 12 and **12*a*, which are shown to be apart from each other, a short distance into the space between the strips. The blow pipes 18, on the one hand, and the blow pipes 20**, on the other, are directed toward each other, and all of the blow pipes are arranged to lie in the parting plane of the closed mold. There are as many blow pipes as are composite cavities (see FIG. 2).

When the mold sections are operated to be closed, which actuation may be accomplished by any suitable means, with portions of the strips 12 and **12*a* within the sections, these strip portions are brought into a contiguous relationship, having short portions at the free ends of the blow pipes 18 and 20** sandwiched between them. From FIG. 2 it will become clear that the short free end portion of each of the blow pipes will be partly received within the neck of a composite cavity.

The mold sections have a sharp edge around each of the half cavities, and such edges of one mold section cooperate with the mating edges of the other section, as the sections close tightly upon each other, to compress pairs of segments or blanks of the strips along these edges. Each two contiguous segments, while being compressed around the edge of the related composite cavity, are edgewise welded together to form an embryo bottle. At the same time, portions of each two contiguous segments are pressed around those portions of the blow pipes, which project into the necks of the composite cavities, thus making sure that the bottles being formed will be closed except for the opening at the neck.

The bottles are blown. Fluid pressure is supplied to each of the embryo bottles. It is ordinarily air that is admitted through two conduits 22 and 24 provided with the referred to branch or blow pipes 18 and 20. The embryo bottles in all the composite cavities expand until they conform to the walls of the cavities and assume the desired shape.

It will be clearly understood that the strips, when formed into embryo bottles, and the embryo bottles, when acted upon, are in a hot condition of plasticity and will not resist any deforming factors.

Important features of my invention are to provide that the bottles be fully sealed, and that the sealing be done, while the bottles are in a condition of plasticity. The sealing may be done, while there is overpressure in the bottles, and is preferably done prior to the removal of the bottles from the mold.

Figures 4, 5:
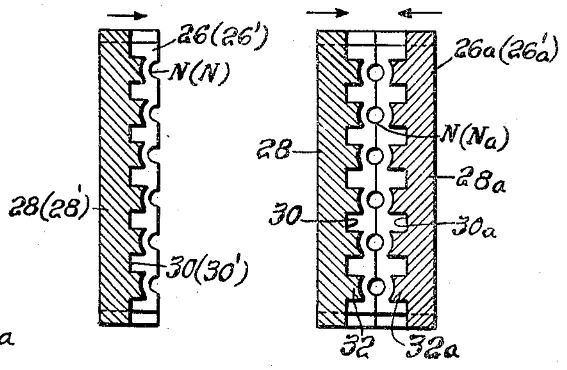
FIG. 4 is a sectional detail view taken in the plane of the line 4—4 of FIG. 2.
FIG. 5 is a sectional view, similarly taken as that of FIG. 4, through both mold sections when closed.

After expansion, press tools are suitably used to compress the neck of each bottle at a place between the body of the bottle and the free end of the blow pipe portion projecting into the neck, and thus to fully seal the bottle. In FIG. 2, slots 26 and 26′ are shown in the mold section 16. A tool 28 having a scalloped surface 30, shown in FIG. 4, is mounted for movements to and fro in the slot 26. An identically shaped tool 28′, for identical operation, is provided in the slot 26′. The mold section **16*a* is identically provided with slots 26*a*′ to receive tools 28*a* and 28*a*′. The angular projections 32 and 32*a* of the undulated surfaces 30 and 30*a* (see FIG. 5) of the two cooperating tools 28 and 28*a* compress the necks of the bottles, as at 34 (see FIG. 2), to seal the bottle necks. The tools 28 and 28′ may be actuated in any convenient manner. In FIG. 4, the tool 28 or 28′ is shown in a nonoperative position to be moved in the direction of the arrow toward the operative or compressing position, and in FIG. 5, two opposing tools 28 and 28*a*** are shown in nonoperative positions, ready to be moved in the directions of the arrows into the operative positions.

It will be apparent that there are many ways of sealing the bottle necks other than the one illustrated in FIGS. 1 to 5 and just described. If tools are used to slide in slots similar to those shown, one of a pair of cooperating tools may be provided with a plane compressing surface to act together with a scalloped surface of the other tool, or both tools may have plane surfaces, or one of two or both tools may have any suitably shaped engaging surface portions. It is also possible to use separate plungerlike tools rather than the platelike tools as shown to do the sealing.

According to the invention, it is required that the plastice material at the time of sealing is at a temperature at which it can readily be deformed, and it is essential that the hot condition at which the sealing takes place is such as to insure sterilization. The sealing, as a rule, is done while the bottles are fully or at least partly enclosed by the mold.

Upon sealing, the mold is opened and the blow pipes are withdrawn.

In view of the fact that thermoplastic materials when in a condition of plasticity and capable of being formed have a temperature of about or at least 150° C., the containers made according to the invention will be sterile, when finished, and will stay sterile since they are formed as fully sealed chambers. Generally, it will do to use cold or slightly warmed air as a pressure medium. The expanding air which enters the containers will become sterile when it comes into contact with the inner walls of the containers. However, I also provide to heat the air or any other pressure medium to about 150° C. prior to the expanding step. Additionally, I provide to pass the pressure medium through a germ filter.

Figures 6, 7:
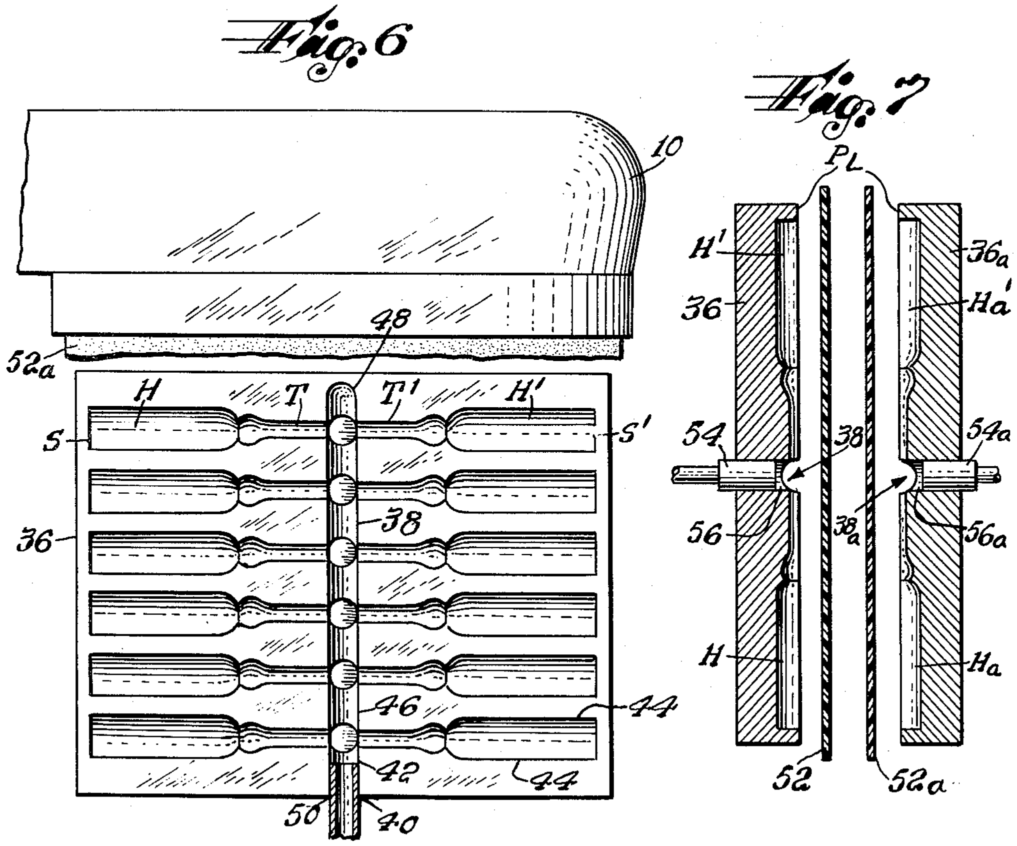
FIG. 6 is an elevational view of a modified mold section, showing the parting surface.
FIG. 7 is a view showing the mold section of FIG. 6 in a mold assembly.

The modified apparatus shown in FIGS. 6 and 7 is designed for the production in a single operation of two rows of six ampoules each. This modified apparatus again includes a press 10 to extrude two parallel strips of a thermoplastic material into the space between two open mold sections. As distinguished from the embodiment of FIGS. 1 to 5, each pair of half cavities H and H′, as provided in the mold section 36, have their bottoms S and S′ apart from each other, while the tips T and T′ are directed toward each other. The half cavities H*a* and H*a*′ in the mold section **36*a* are identically shaped and arranged. As another essential distinction from the embodiment of FIGS. 1 to 5, all the half cavities provided in either of the mold sections 36 and 36*a* are interconnected by a channel-like cavity 38 and 38*a***, respectively.

Each mold section is provided with a sharp edge running along the contours of the half cavities and the channel-like cavity. For instance, the edge of the mold section 36 starts at 40, continues as 42, moves around as 44, moves on as 46, moves around the next adjacent half cavity, and further on to and around the half cavity on top of the row, moves around the closed end portion 48 of the channel cavity 38, and similarly travels back to 50. This sharp edge cooperates with the opposing mating edge provided on the mold section **36*a*, when the mold sections are tightly closed, to compress the two strips 52 and 52*a*** along the coinciding two edges almost to the point of cutting out the portions of the two plastic strips, which lie between the cavities.

With the two strips 52 and **52*a* freshly extruded, and the mold sections 36 and 36*a* tightly closed, two opposing half cavities will complement each other to form a composite cavity for one ampoule, and the channels 38 and 38*a*** will form a composite cavity for a passageway. Out of the plastic strips, a flat embryo structure will be formed, which consists of two rows of six embryo ampoules each, and an embryo passageway, whereby the embryo ampoules extend parallel to one another as do the half cavities and composite cavities, and are integrally formed with the embryo passageway. The ampoules are connected with the passageway at their tips for a free flow of fluid pressure.

The embryo structure as referred to hereinbefore forms a sealed chamber except for one opening at one end of the embryo passageway to communicate with a supply line of fluid pressure. In FIG. 6, the end at 40, 50 is shown open.

As soon as the embryo structure is formed, blowing air or any other pressure medium is introduced through the open end of the embryo passageway, which blowing operation expands the embryo structure into shaping contact with the mold. While under overpressure, the ampoules are sealed. For this purpose, plungers 54, 54*a* are operated to slide in matingly shaped bores 56 and 56*a* to simiultaneously seal the open ends of all twelve ampoules. Upon sealing, the mold sections are opened and the ampoules are removed from the remainder or waste of the blown structure.

The plungers 54 and 54*a* may be formed as separate parts or integrally with another part, and the operation of the compressing tools may be provided in any suitable way.

Figure 8:
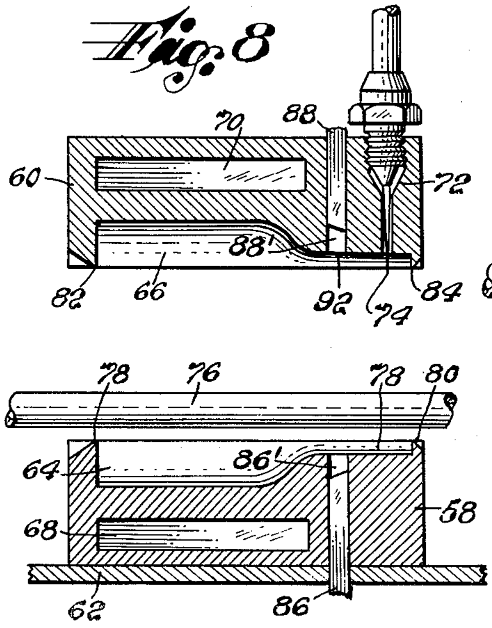
FIG. 8 is a cross section through an open mold of different construction.

It will be noted that the apparatus of FIGS. 7 and 8 does not require conduits and blow pipes as self-sufficient parts of a mold assembly, as the conduits and blow pipes of the apparatus of FIGS. 1 to 5 constitute. Instead, the embryo passageway for the conduction of pressure fluid is formed by molding, at the same time as the embryo ampoules are molded.

Figure 9:
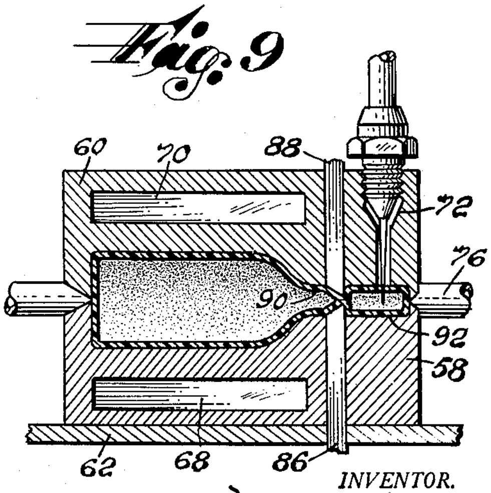
FIG. 9 shows the mold of FIG. 8 in closed condition.

My method of making sterile containers from plastics is also applicable to other fabrications, for instance, to the fabrication whereby an extrusion press with an annular extrusion nozzle is mounted above a sectional mold, and tubing in a condition of plasticity is extruded into the space between the open mold sections. The mold shown in FIGS. 8 and 9 consists of sections or halves 58 and 60. The two halves are movable toward and away from one another. In the embodiment selected for illustration, the half 58 constitutes the lower half and is secured to a turn table 62, whereas the other or upper half 60 is vertically movable. The mold halves are provided with opposing mold cavities 64 and 66 to form a bottle, and with fluid chambers 68 and 70 to control the temperature of the mold. The upper mold half is also provided with an opening 72 for the purpose hereinafter disclosed, which opening communicates between the outside and the mold cavity 66 near the free end of the bottle neck. A hollow needle 74, such as a hypodermic needle, is disposed within the opening and extends into the mold cavity 66.

A tubing 76 of a thermoplastic material has been extruded from a plastic extrusion machine (not shown) and caused to rest, while hot and soft, upon the sharp edges 78 and 80 of the lower mold half 58. When the upper mold half is urged downwardly to close tightly against the lower mold half, sharp edges 82 and 84 of the upper half and the edges 78 and 80 of the lower half compress the tube and provide thereby a sealed tube segment within the composite cavity formed by mold cavities 64 and 66, except for the opening made by the needle 74. As the upper mold half closes upon the lower mold half, the needle pierces the wall of the tube and enters the otherwise sealed tube segment. A fluid is now forced through the hollow needle into the sealed tube segment to expand the tube against the inside walls of the composite cavity and to form the bottle. Upon the formation of the bottle, two plungers 86 and 88 provided in matingly shaped openings 86' and 88' in the mold halves are actuated to move toward each other to compress and seal the neck portion at 90 and to sever the neck extension 92 from the rest of the neck. The neck extension is later removed. Thus a fully sealed bottle has been formed without the fluid pressure within the bottle being released. If desired, a coolant, such as water, may be circulated through the chambers 68 and 70, through which a heating fluid may have been circulated during molding.

The fluid used to expand the containers of FIGS. 1 to 5, and 8 and 9, and the structure of FIGS. 6 and 7, against the walls of the composite cavities of the molds is, as has been indicated, usually air, but may be any inert gas or an inert liquid. It is within the scope of the present invention to use such a fluid for the expansion of containers as is intended to be finally held by the containers, for instance, milk, a fruit juice.

It will be recognized that whenever mold sections, when brought into engagement, fail to cut finished articles completely from waste material, such waste will facilitate the manual removal of the articles from the mold. It will also be recognized, however, that if it becomes desirable to use automatic means for stripping blown articles from the molds, such sharp edges may be provided as will effect a complete separation of the articles from waste.

The plastic material has sometimes been referred to hereinbefore as "thermoplastic." However, it will be understood that this invention is not limited to the use of what is generally known as thermoplastic materials. Instead, the term "thermoplastic" shall cover any material that has the necessary plasticity characteristics.

Figures 10, 11, 12, 13, 14, 15, 16, 17:
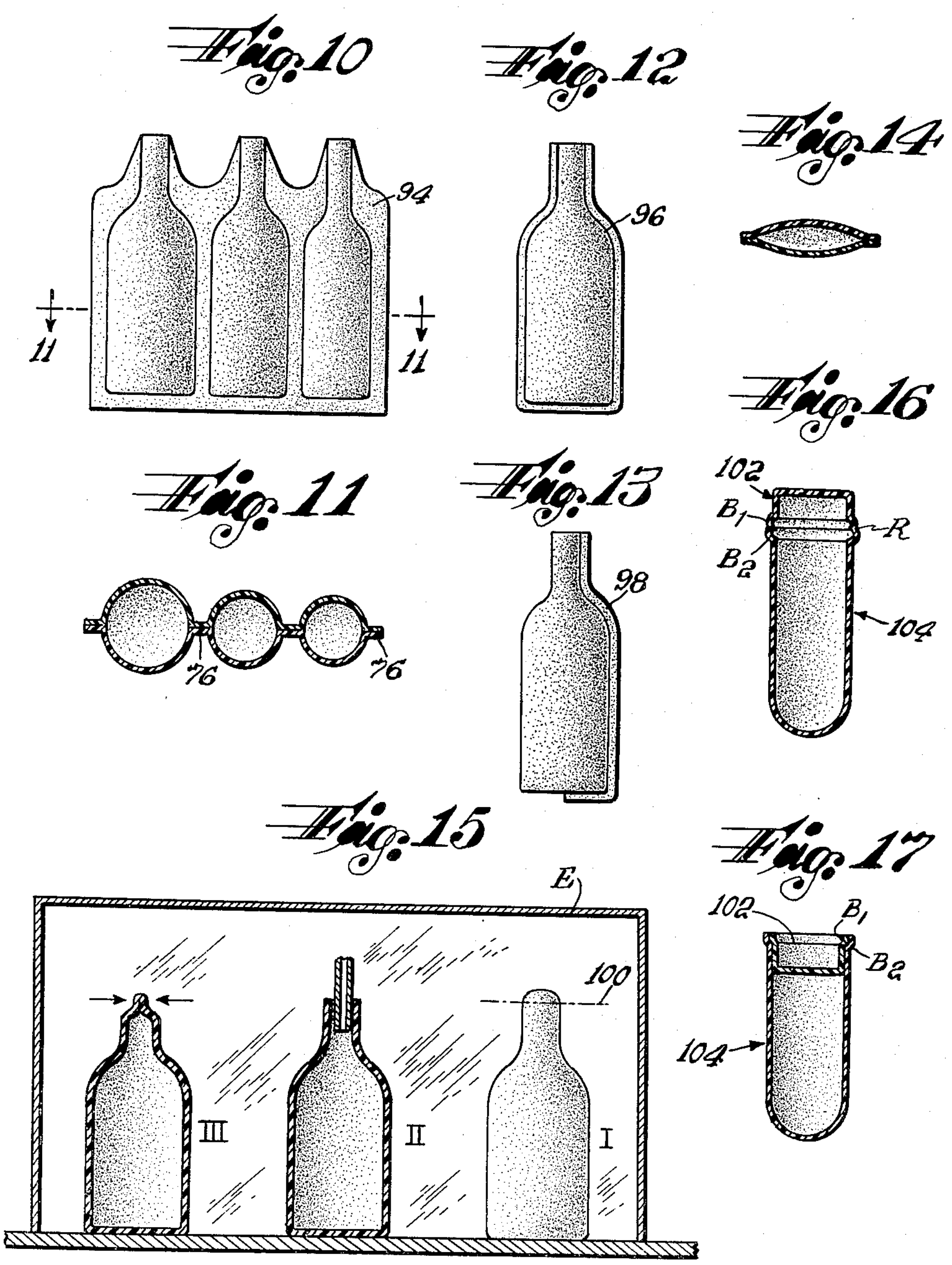
FIG. 10 illustrates a structure including three bottle-shaped containers according to the invention.
FIG. 11 is a section taken in the plane of the line 11—11 of FIG. 10.
FIG. 12 is an elevational view of an individual bottle.
FIG. 13 shows a modified bottle.
FIG. 14 is a cross section through a particularly shaped neck of a container.
FIG. 15 is explanatory of the handling of a bottle according to the invention at a bottling station.
FIG. 16 is a longitudinal section through a container of the invention.
FIG. 17 shows the container of FIG. 16 in a different condition.

It will be clear that the container according to this invention may be made in any convenient shape. In FIGS. 10 and 11, a unitary structure of three differently sized sealed bottles is shown, which structure includes an appending rim 94 that has been formed in the parting face of the mold used. The individual three bottles are thus connected by webs, which offers the advantage of easier handling and shipping. FIG. 12 shows an individual bottle having a reinforcing rim 96 all around except for the top of the sealed neck, and FIG. 13 shows a bottle provided only with a lengthwise running rim 98, the bottom being flat. Rims as shown in FIGS. 10 to 13, which are formed in the parting plane of the mold during molding, offer a welcome reinforcement in the case of small containers made of thin section materials and are helpful as guides in automatic bottling machines.

According to one aspect of my present invention, I provide a bottle neck of elliptical, oval or generally elongated cross section. Such neck is shown in FIG. 14. When sealing a bottle neck or an ampoule tip, I have found that the resistance to obtaining a safe weld is very much less if the neck or tip is of elongated rather than circular cross section. Also, the tensions created in a bottle neck by the pressures used to compress and weld the neck are less in the case of elongated bottle necks than in the case of circular ones.

In FIG. 15, a bottling setup is shown schematically. A sealed ampoule which is sterile on the inside, due to having been produced according to the invention, is sterilized on the outside and brought to the station I. There, the ampoule is provided with an opening by cutting off the closed neck end as at 100. The filling takes place at the station II, and at the station III, the open neck is sealed by compressing the wall of the neck in the direction of the two arrows shown. All three stations are placed within an enclosure E of a sterile atmosphere.

In the present case, since containers made of plastics are used, the opening of the sealed container to make its filling possible may be omitted altogether. Instead, a needle for filling may be used, which pierces the wall.

FIG. 16 shows a container according to the invention, that comprises a top portion 102 and a bottom portion 104, with each of the portions terminating in a bead $B_1$ and $B_2$, respectively, both beads being of substantially identical dimensions. The cross section of an annular ring R between the beads is small so as to allow the two portions to be easily separated. Due to the elasticity inherent in the material, it is possible to use the top portion as a stopper for the bottom portion by inserting the top in an upside down fashion into the bottom portion, as shown in FIG. 17. It is believed that the method of my invention, as well as the construction and operation of the apparatus for practicing the method and making the container, and the many advantages thereof, will be fully understood from the foregoing detailed description. In reviewing the primary advantage, it is pointed out that my method and apparatus yields a sterile container which remains sterile since it is obtained as a sealed chamber. It will be appreciated that the production of a plastic container by blowing and sealing in the same mold constitutes an immense simplification. All the procedures for sterilizing a container before filling are done away with. It may be added that in the case of ampoules, the ampoules of the invention can be filled to a higher level since no portion of the top length is needed for being broken off, as it is with glass ampoules. An injection needle, upon sterilizing the outside of the ampoule, can simply be pushed through the wall of the ampoule. It will be apparent that upon filling my ampoule with a solution for injection the space above the liquid level can, if desired, be filled with an inert gas. The pressure in containers, after being blown to conform to the mold shape, may be released before sealing. However, the invention also provides sealing of the blown containers, while under an interior overpressure. In the latter case, it is preferred to provide for such an overpressure that even after cooling there will still be some overpressure existent. Such overpressure will become apparent at the time of filling, which will be proof of sterility. It will be clear that it is possible to mold reheated and resoftened plastic material into what has been referred to as an "embryo container," rather than extruding plastic material directly into an open mold space.

The use of a structure as shown in FIG. 10 will prove most useful when different contents are medically associated, such as a serum and distilled water, or when increasing quantities of a preparation are to be applied to the same patient. While bottles for sputum and stool, when made of glass, have to be sterilized, together with their contents, before they can be discarded, plastic bottles and their contents can simply be burned.

It will be apparent that while I have shown and described my invention in a few forms only, many changes and modifications may be made without departing from the spirit of the invention defined in the following claims.

I claim:

1. Process for the simultaneous manufacture from plastics of at least two hollow articles, comprising spacedly extending at least two strips of the plastic material to suspend vertically into the space between the open sections of a sectional mold, closing the mold to form a composite cavity including cavities for at least two articles and a cavity for a passageway leading to the article cavities, pinching off and sealing segments of the strips, thus forming a hollow embryo structure including at least two embryo articles and an embryo passageway, said structure being closed except for a single opening, admitting a pressure medium to said structure through said opening, expanding the embryo articles and the passageway to the interior shape of the mold, sealing the articles thus obtained, while still in a condition of plasticity, opening the mold, and separating the sealed articles from the mold and the waste plastic material.

2. Apparatus for the manufacture from plastics of at least a single hollow article at any one time, including a two-section mold, each mold section being provided in its mold parting face with a half cavity for at least said single article and a half cavity for a passageway leading from a mold edge to the article half cavity, nozzle means to extrude at least two strips of the plastic material to suspend spacedly and vertically into the space between the open mold sections, the mold sections being provided with compressing edges along the contours of the half cavities of article and passageway, means to admit a pressure medium to the composite cavity for the passageway, and at least a pair of compressing tools to seal the article.

3. In the apparatus according to claim 2, each mold section being provided with half cavities for at least four articles and a half cavity for a passageway leading from a mold edge to the article cavities, the article half cavities being arranged in two rows, with an article half cavity of one row being horizontally aligned with an article half cavity of the other row, the half cavity for the passageway including a channel extending centrally of the two rows, each mold section being provided with a slot lying in a plane through the channel perpendicular to the mold parting face, the apparatus further including a pair of cooperating compressing tools for actuation into and out of compressing engagement to seal the articles, each tool being received in one of said slots.

References Cited in the file of this patent

UNITED STATES PATENTS

| | | |
|---|---|---|
| 2,099,055 | Ferngren | Nov. 16, 1937 |
| 2,219,576 | Moreland | Oct. 29, 1940 |
| 2,285,370 | Staelin | June 2, 1942 |
| 2,349,177 | Kopitke | May 16, 1944 |
| 2,479,581 | Masci | Aug. 23, 1949 |
| 2,515,093 | Mills | July 11, 1950 |
| 2,541,249 | Hobson | Feb. 13, 1951 |
| 2,619,228 | Long | Nov. 25, 1952 |
| 2,781,551 | Richerod | Feb. 19, 1957 |
| 2,918,698 | Hagen et al. | Dec. 29, 1959 |

FOREIGN PATENTS

| | | |
|---|---|---|
| 1,134,426 | France | Dec. 3, 1956 |
| 747,434 | Great Britain | Apr. 4, 1956 |